(No Model.)
W. GEE.
Pot or Cup for Making Coffee, &c.
No. 240,402.  Patented April 19, 1881.
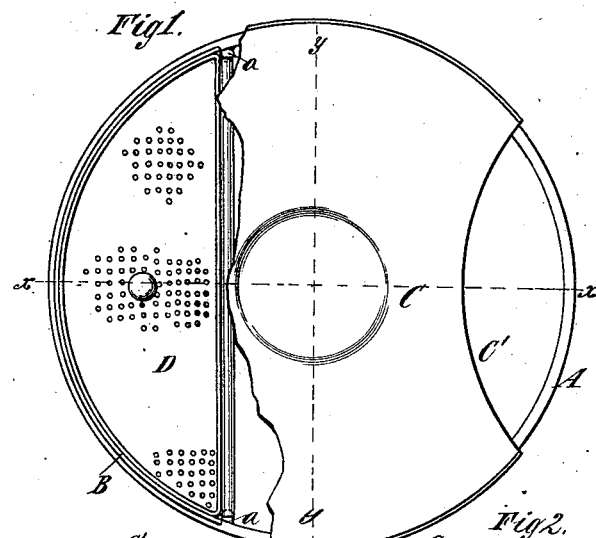
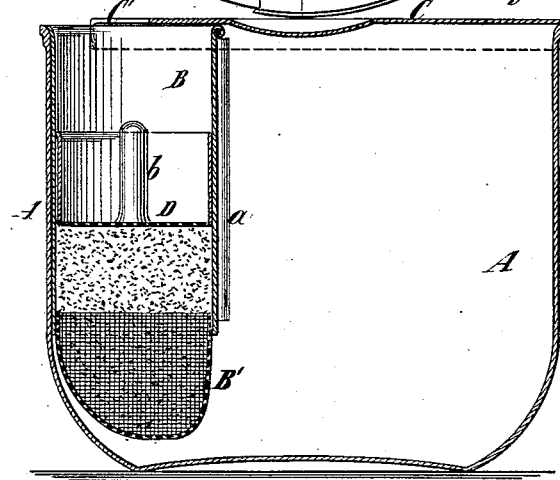
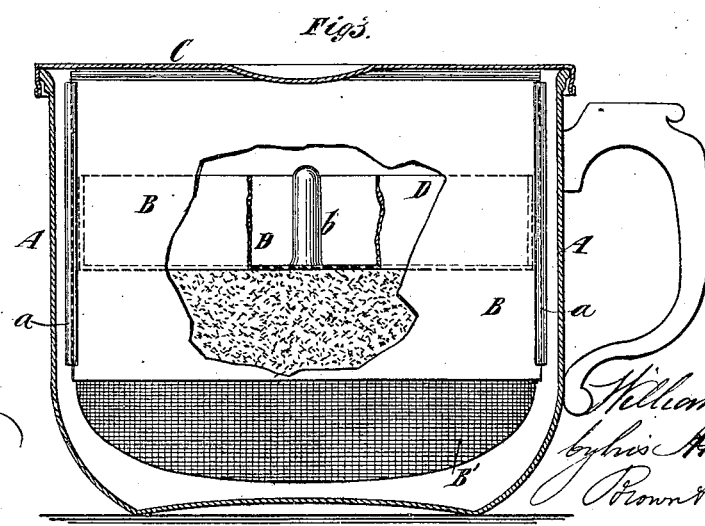
Witnesses  Inventor
William Gee
by his Attorneys
Brown & Brown

UNITED STATES PATENT OFFICE.

WILLIAM GEE, OF NEW YORK, N. Y.

POT OR CUP FOR MAKING COFFEE, &c.

SPECIFICATION forming part of Letters Patent No. 240,402, dated April 19, 1881.

Application filed February 17, 1881. (No model.)

*To all whom it may concern:*

Be it known that I, WILLIAM GEE, of the city and county of New York, in the State of New York, have invented certain new and useful Improvements in Pots or Cups for Making Coffee and other Decoctions, of which the following is a specification.

The invention consists in a pot or cup having upright guides upon its interior and a removable holder and percolator fitting between said guides and one side of the pot or cup. The coffee or other material from which a decoction is to be made is placed in the holder and percolator and boiling water poured thereon to leach the coffee or other substance and form the decoction, which is strained through the perforated or reticulated bottom of the holder and percolator into the body of the pot or cup, from which it may be drunk. The removable holder and percolator may be readily removed for cleaning or to enable the pot or cup to be used without it. I also preferably provide the pot or cup with a cover having an opening in one side, and which may be turned or rotated upon the top of the pot or cup to bring said opening over the holder and percolator, so as to permit of pouring water into the percolator without removing the cover, or to bring said opening upon the other side of the pot or cup and form a guard to make a mustache-cup, and in any case to retain the aroma in the cup. I also provide a perforated or reticulated distributer, which may be inserted in the holder and percolator above the coffee, tea, or other substance, to distribute the water and deliver it upon the whole surface, and which may be pressed down upon the coffee or other substance in the holder or percolator.

In the accompanying drawings, Figure 1 represents a plan of a pot or cup embodying my invention, with a portion of the cover broken away. Fig. 2 represents a vertical section thereof upon the dotted line *x x*, Fig. 1; and Fig. 3 represents a similar section upon the dotted line *y y*, Fig. 1.

Similar letters of reference designate corresponding parts in all the figures.

A designates a pot or cup, which may be of any suitable form and made of earthenware or metal; and B designates a holder and percolator of segmental form, as shown in Fig. 1, and having its curved side fitted to the interior of the cup upon one side. The holder and percolator is made of metal, and has a perforated or reticulated bottom portion, B', through which water will pass freely. The cup is provided with vertical guides *a*, which, when the cup is made of metal, may consist simply of wires soldered to the side of the cup. The holder and percolator is thus retained between the side of the cup and guides *a*, and may be readily drawn out for cleaning.

C designates a metal cover, which is made to fit over the top of the cup, and which is intended to rest upon the upper edge of the cup and the holder and percolator, as shown in Figs. 2 and 3. In one side of the said cover is an opening, C', (shown clearly in Fig. 1,) and the cover may be readily turned or rotated so as to bring the opening above the holder and percolator, to enable water to be poured in without removing the cover, or so as to bring the opening upon the opposite side of the cup to the position shown in Fig. 1, to form a guard, making a mustache-cup.

D designates a distributer adapted to fit snugly in the holder and percolator above the coffee, tea, or other substance therein. This distributer has a perforated or reticulated bottom, and when pressed tightly down upon the coffee, tea, or other substance it is obvious that it will distribute the water evenly over the surface and cause all portions of the contents of the holder and percolator to be reached by the water. The distributer is provided with a hand-piece, *b*, by which it may be removed from the holder and percolator.

When it is desired to make a cup of coffee, tea, or other decoction, the substance from which it is to be made (coffee, for instance) is placed in the holder and percolator, and the distributer is inserted into the percolator above it. The water is then poured through the distributer, slowly at first, in order that all the contents of the holder and percolator may be thoroughly wet, and afterward as fast as it will percolate through the coffee until the cup is full enough. The holder and percolator may then be removed, if desirable, as the coffee will then have been deprived of most of its strength, or it may be left in.

If the coffee is coarse, the distributer may be pressed tightly down upon it; but if fine coffee is used the distributer may be near the top of the cup.

The coffee made in this way is strong and of very excellent quality, as the bottom of the percolator is near the bottom of the cup and in the hot coffee all the time the water is passing through, and every drop of water must pass through the holder and percolator, thus keeping the coffee soft, in which condition it will readily yield its strength to the boiling water.

What I claim as my invention, and desire to secure by Letters Patent, is—

1. A pot or cup having upright guides upon its interior and a removable holder and percolator fitting between said guides and the side of the cup, substantially as and for the purpose specified.

2. A pot or cup having a holder or percolator on one side of its interior, in combination with the cover C, which has an opening, C', and which may be turned or rotated to bring said opening over the holder and percolator and cover the body of the pot or cup, or to cover the holder and percolator and bring said opening over the body of the pot or cup, whereby the cover is made to serve as a mustache-guard, substantially as specified.

3. A pot or cup having a holder and percolator one side of its interior, in combination with a water-distributer inserted in said holder and percolator and adapted to be adjusted vertically, so that it may rest directly upon the contents of the holder and percolator, substantially as and for the purpose specified.

WILLIAM GEE.

Witnesses:
FREDK. HAYNES,
ED. GLATZMAYER.